US010852586B2

(12) United States Patent
Li et al.

(10) Patent No.: US 10,852,586 B2
(45) Date of Patent: Dec. 1, 2020

(54) DIRECT TYPE BACK-LIGHT MODULE AND DISPLAY DEVICE HAVING A FRAMELESS VISUAL EFFECT

(71) Applicants: CORETRONIC (SUZHOU) CO., LTD., Jiangsu (CN); Coretronic Corporation, Hsin-Chu (TW)

(72) Inventors: Bin Li, Jiangsu (CN); Liang-Kuo Tsao, Jiangsu (CN); Hua-Te Feng, Jiangsu (CN); Wen-Pin Yang, Jiangsu (CN)

(73) Assignees: CORETRONIC (SUZHOU) CO., LTD., Jiangsu Province (CN); Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/826,315

(22) Filed: Mar. 23, 2020

(65) Prior Publication Data

US 2020/0310198 A1    Oct. 1, 2020

(30) Foreign Application Priority Data

Apr. 1, 2019    (CN) .......................... 2019 2 0428807

(51) Int. Cl.
*G02F 1/13357*    (2006.01)
(52) U.S. Cl.
CPC .. *G02F 1/133608* (2013.01); *G02F 1/133603* (2013.01); *G02F 1/133605* (2013.01); *G02F 1/133606* (2013.01)
(58) Field of Classification Search
CPC ......... G02F 1/133608; G02F 1/133606; G02F 1/133605; G02F 1/133603
See application file for complete search history.

(56) References Cited

U.S. PATENT DOCUMENTS

| 2015/0070931 | A1* | 3/2015 | Lin | G02B 6/0031 |
| | | | | 362/609 |
| 2015/0309355 | A1* | 10/2015 | Murakami | G02B 6/0031 |
| | | | | 349/58 |
| 2016/0161665 | A1* | 6/2016 | Chen | G02B 6/0085 |
| | | | | 362/629 |
| 2019/0163016 | A1* | 5/2019 | Kim | H01L 51/50 |

FOREIGN PATENT DOCUMENTS

CN    103091899    5/2013

* cited by examiner

*Primary Examiner* — Tracie Y Green
(74) *Attorney, Agent, or Firm* — JCIPRNET

(57) ABSTRACT

A direct type backlight module includes a back plate, a light emitting element, and a frame body. The light emitting element is disposed on the back plate and configured to provide an illumination beam. The frame body is disposed on the back plate to surround the light emitting element. The frame body includes a light transmitting portion and a reflecting portion. The light transmitting portion is located at an edge of a light emitting side of the direct type backlight module. The reflecting portion is located between the light transmitting portion and the back plate. The light transmitting portion has a carrier portion, wherein the illumination beam is configured to be transmitted into the light transmitting portion, transmitted to the carrier portion of the light transmitting portion by reflection of the reflecting portion, and then emitted. A display device including the direct type backlight module is also provided.

20 Claims, 2 Drawing Sheets

DIRECT TYPE BACK-LIGHT MODULE AND DISPLAY DEVICE HAVING A FRAMELESS VISUAL EFFECT

CROSS-REFERENCE TO RELATED APPLICATION

This application claims the priority benefit of China application serial no. 201920428807.3, filed on Apr. 1, 2019. The entirety of the above-mentioned patent application is hereby incorporated by reference herein and made a part of this specification.

BACKGROUND

Technical Field

The disclosure relates to a light emitting module and an electronic device, and more particularly to a direct type backlight module and a display device.

Description of Related Art

A liquid crystal display includes a liquid crystal display panel and a backlight plate. A backlight module can provide a surface light source to the liquid crystal display panel, so that the user can view the image displayed by the liquid crystal display panel. In general, the backlight module can be classified into a direct type backlight and a side type backlight. Compared with the side type backlight, the direct type backlight can provide a surface light source with a higher brightness. Therefore, when there is a higher demand for the brightness of the backlight light source, the direct type backlight module is usually employed.

In conventional narrow-frame televisions, it is a common method to use a plastic frame to carry a diffusion plate and an optical film layer and to use the plastic frame to carry the display panel so as to achieve the purpose of displaying a narrow frame. However, the frame size of this method is limited by the width size of the carrier surface, and since the plastic frame and buffer strips are opaque, the light source cannot reach the end part of the plastic frame, so the display effect is still limited. At present, the width size of the plastic frame carrier surface has to be designed to be 1.0 mm or more. In addition, since the display panel is placed on the carrier surface of the plastic frame, the precision requirements and stability requirements of the plastic frame and the back plate are also high, and a slight deviation will cause the plastic frame to enter an effective light emitting image and block the pixels.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a direct type backlight module and a display device achieving a frameless visual effect.

Other objects and advantages of the disclosure may be further understood from the technical features disclosed herein.

In order to achieve one or a part or all of the above or other objects, an embodiment of the disclosure provides a direct type backlight module including a back plate, a light emitting element, and a frame body. The light emitting element is disposed on the back plate and is configured to provide an illumination beam. The frame body is disposed on the back plate to surround the light emitting element. The frame body includes a light transmitting portion and a reflecting portion. The light transmitting portion is located at an edge of a light emitting side of the direct type backlight module. The reflecting portion is located between the light transmitting portion and the back plate. The light transmitting portion has a carrier portion, wherein the illumination beam is configured to be transmitted into the light transmitting portion, transmitted to the carrier portion of the light transmitting portion by reflection of the reflecting portion, and then emitted.

In order to achieve one or a part or all of the above or other objects, another embodiment of the disclosure provides a display device including a direct type backlight module and a display panel. The direct type backlight module is configured to provide an illumination beam. The direct type backlight module includes a back plate, a light emitting element, and a frame body. The light emitting element is disposed on the back plate and is configured to provide the illumination beam. The frame body is disposed on the back plate to surround the light emitting element. The frame body includes a light transmitting portion and a reflecting portion. The light transmitting portion is located at an edge of a light emitting side of the direct type backlight module. The reflecting portion is located between the light transmitting portion and the back plate. The light transmitting portion has a carrier portion. The display panel is disposed on a transmission path of the illumination beam and on the frame body, wherein the illumination beam is configured to be transmitted into the light transmitting portion, transmitted to the carrier portion of the light transmitting portion by reflection of the reflecting portion, and then emitted to an edge of the display panel.

Based on the above, the embodiments of the disclosure have at least one of the following advantages or effects. In the direct type backlight module and the display device of the disclosure, the frame body includes the light transmitting portion and the reflecting portion and is configured that the illumination beam is transmitted into the light transmitting portion, is transmitted to the carrier portion of the light transmitting portion by reflection of the reflecting portion, and then is emitted. In this way, by the collaborative effect of the light transmitting portion and the reflecting portion, a part of the frame body serving as the frame of the display device can also assist in transmitting the illumination beam, thereby enabling the user to view and experience the frameless visual effect of the display device.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
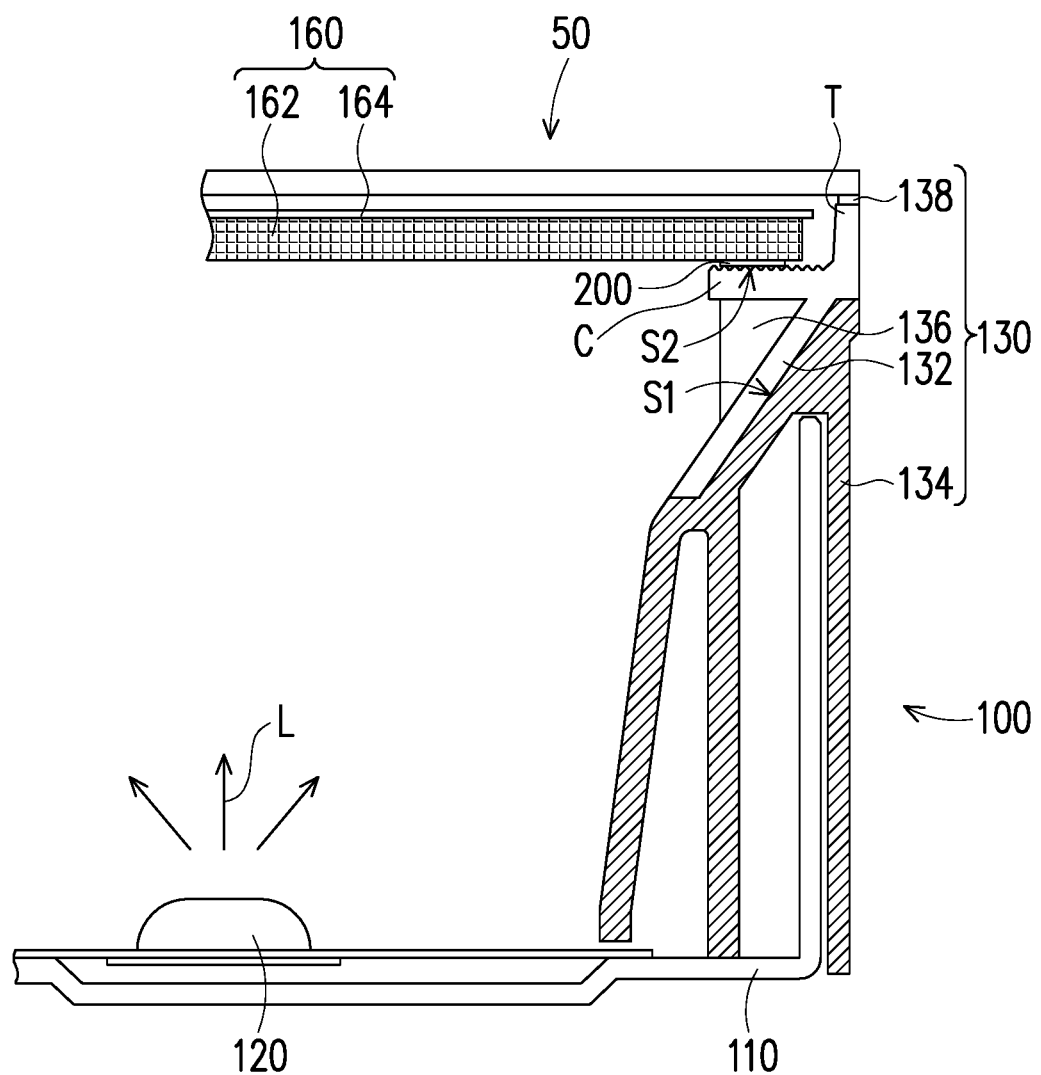
FIG. 1 is a schematic cross-sectional view of a part of a display device according to an embodiment of the disclosure.

FIG. 1 is a schematic cross-sectional view of a part of a display device according to an embodiment of the disclosure. Please refer to FIG. 1. The embodiment provides a display device 10 including a direct type backlight module 100 and a display panel 50, wherein the direct type backlight module 100 is configured to provide an illumination beam L to the display panel 50, and the display panel 50 is disposed on the direct type backlight module 100. The display device 10 of the embodiment is, for example, a frameless television display having a light emitting diode, and the user can experience the frameless visual effect of the display device 10 when viewing the display, but the disclosure is not limited thereto.

In the embodiment, the direct type backlight module 100 includes a back plate 110, a light emitting element 120, and a frame body 130. The back plate 110 has a circuit structure and serves as an outer casing or a bottom casing of the direct type backlight module 100. The light emitting element 120 is disposed on the back plate 110 and configured to provide the illumination beam L in a direction away from the back plate 110 (i.e., a light emitting direction). In the embodiment, the light emitting element 120 is, for example, a light emitting diode array, but the disclosure is not limited thereto, and other types or forms of light emitting elements may be employed.

The display panel 50 is disposed on a transmission path of the illumination beam L and on the frame body 130. The display panel 50 is, for example, a liquid crystal display panel, but the disclosure is not limited thereto. The backlight module 100 further includes at least one optical element 160. Specifically, in the embodiment, the optical element 160 sequentially includes a diffusion element 162 and at least one optical film 164 from a light incident side to a light emitting side. In the embodiment, the diffusion element 162 is, for example, a diffusion plate. The optical film 164 is, for example, a diffusion film or a brightness enhancement film. However, the disclosure does not limit the structural form and type of the optical element 160.

Figure 2:
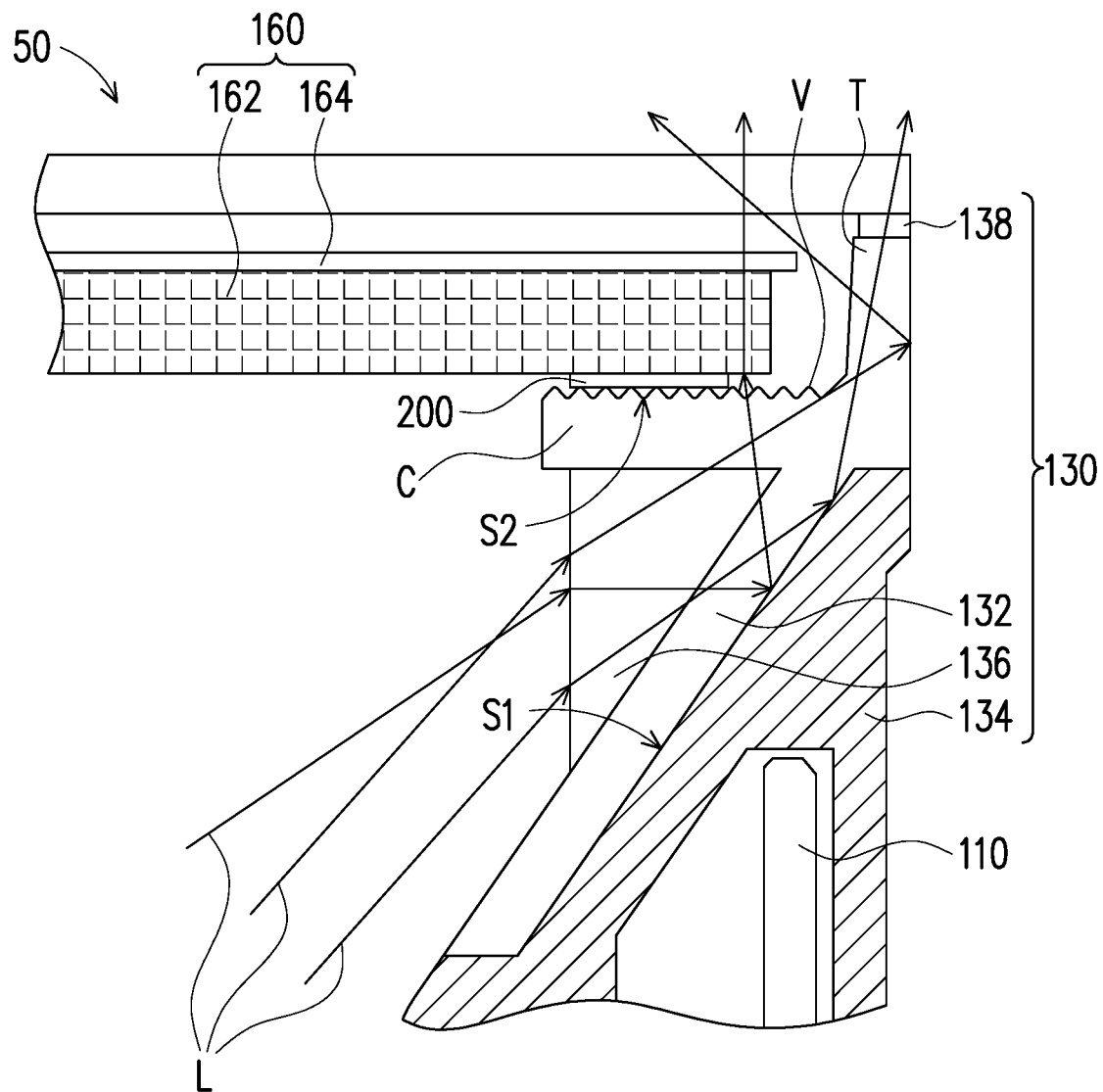
FIG. 2 is a schematic partially enlarged view of the display device of FIG. 1.

FIG. 2 is a schematic partially enlarged view of the display device of FIG. 1. Please refer to FIGS. 1 and 2. The frame body 130 is disposed on the back plate 110 to surround the light emitting element 120. In detail, in the embodiment, the frame body 130 includes a light transmitting portion 132 and a reflecting portion 134. The light transmitting portion 132 is located at an edge of the light emitting side of the direct type backlight module 100, and the reflecting portion 134 is located between the light transmitting portion 132 and the back plate 110. In other words, the reflecting portion 134 of the frame body 130 is disposed on the back plate 110. Specifically, the reflecting portion 134 may be adapted to the structure at an edge of the back plate 110, and may be combined and fixed without additional adhesive members or fixing members, but the disclosure is not limited thereto. In the embodiment, the light transmitting portion 132 may be trimmed flush with the display panel 50 to exhibit a neat frameless shape, but the disclosure is not limited thereto.

The light transmitting portion 132 and the reflecting portion 134 are made of different materials. In detail, in the embodiment, the light transmitting portion 132 is made of a light transmitting plastic material, such as polycarbonate (PC), but the disclosure is not limited thereto. The reflecting portion 134 is made of a white material having a reflecting property. In the embodiment, the light transmitting portion 132 and the reflecting portion 134 may be simultaneously manufactured by using a plastic double injection molding technique. However, in other embodiments, the light transmitting portion 132 and the reflecting portion 134 may be manufactured separately and combined by adhesion. Specifically, in the above embodiments, the frame body 130 further includes an adhesive layer connected between the light transmitting portion 132 and the reflecting portion 134 to fix the light transmitting portion 132 and the reflecting portion 134. Alternatively, in another embodiment, both the light transmitting portion 132 and the reflecting portion 134 have at least one engaging structure, and the light transmitting portion 132 and the reflecting portion 134 are combined by the at least one engaging structure thereof. However, the disclosure does not limit the forms and types of manufacture, molding, and combination of the light transmitting portion 132 and the reflecting portion 134.

In the embodiment, the light transmitting portion 132 of the frame body 130 has a carrier portion C and has a second optical surface S2 parallel to an overall extending direction of the direct type backlight module 100 (i.e., the horizontal direction) for carrying the optical element 160. Specifically, in the embodiment, the carrier portion C carries the diffusion element 162. In more detail, in the embodiment, the display device 10 further includes a connecting element 200 disposed on the second optical surface S2 of the light transmitting portion 132 and connected between the at least one optical element 160 (i.e., the diffusion element 162) and the light transmitting portion 132. In the embodiment, the connecting element 200 is, for example, a diffusion plate fixing adhesive or other types of fixing strips. Therefore, the diffusion element 162 of the optical element 160 can be fixed on the carrier portion C of the light transmitting portion 132.

Further, a top end T of the light transmitting portion 132 serves as a frame of the entire display device 10 and carries the display panel 50. In more detail, in the embodiment, the frame body 130 further includes a light transmitting buffer member 138 connected to the top end T of the light transmitting portion 132, and the light transmitting portion 132 is located between the light transmitting buffer member 138 and the reflecting portion 134. In the embodiment, the light transmitting buffer member 138 is, for example, a light transmitting strip made of polyethylene terephthalate (PET), but the disclosure is not limited thereto. Specifically, the light transmitting portion 132 surrounds a part of the periphery of the display panel 50; that is, the light transmitting portion 132 serves as a part of the casing of the display device 10. In the part serving as the casing of the display device 10, the light transmitting buffer member 138 is disposed on the top end T of the light transmitting portion 132 to be connected between the display panel 50 and the light transmitting portion 132. In this way, a buffering force can be provided between the display panel 50 and the light transmitting portion 132, thereby achieving a protection effect.

When the light emitting element 120 emits the illumination beam L, the reflecting portion 134 of the frame body 130 can reflect the illumination beam L, and the light transmitting portion 132 of the frame body 130 can allow the illumination beam L to pass. Therefore, the illumination beam L emitted by the light emitting element 120 can enter the light transmitting portion 132 of the frame body 130, be transmitted to the carrier portion C of the light transmitting portion 132 by the reflection of the reflecting portion 134, and be emitted to the display panel 50. Besides, the illumination beam L emitted by the light emitting element 120 can enter the light transmitting portion 132 of the frame body 130, be transmitted to the top end T of the light transmitting portion 132 by the reflection of the reflecting portion 134, and be emitted to the edge of the display panel 50. In the end, the illumination beam L can be transmitted and emitted toward the display side of the display device 10, thereby achieving the effect that the entire display panel 50 emits light. In this way, by the collaborative effect of the light transmitting portion 132 and the reflecting portion 134, the part of the frame body 130 serving as the frame of the display device 10 can also assist in transmitting the illumination beam L, thereby enabling the user to view and experience the frameless visual effect of the display device 10.

In detail, in the embodiment, the reflecting portion 134 has a first optical surface S1 inclined to the overall extending direction of the direct type backlight module 100 (i.e., the horizontal direction), and the light transmitting portion 132 is connected to the reflecting portion 134 and covers the first optical surface S1. Therefore, the illumination beam L can be reflected by the first optical surface S1, and the loss of light transmission can be reduced. In the light transmitting portion 132, the second optical surface S2 of the light transmitting portion 132 has a prism structure V, as shown in FIG. 2. In this way, the effect of light source conduction and scattering can be further enhanced, so that the frame can also emit light, but the disclosure is not limited thereto.

In the embodiment, the frame body 130 further includes a light transmitting support member 136 disposed on the light transmitting portion 132 to support a part of the light transmitting portion 132. In this way, the supporting force of the light transmitting portion 132 for the display panel 50 can be further increased. In another embodiment, the light transmitting support member 136 and the light transmitting portion 132 are made of the same material and are integrally manufactured, but the disclosure is not limited thereto.

In summary, the embodiments of the disclosure have at least one of the following advantages or effects. In the direct type backlight module and the display device of the disclosure, the frame body includes the light transmitting portion and the reflecting portion and is configured that the illumination beam is transmitted into the light transmitting portion, is transmitted to the carrier portion of the light transmitting portion by the reflection of the reflecting portion, and then is emitted. In this way, by the collaborative effect of the light transmitting portion and the reflecting portion, the part of the frame body serving as the frame of the display device can also assist in transmitting the illumination beam, thereby enabling the user to view and experience the frameless visual effect of the display device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A direct type backlight module comprising a back plate, a light emitting element, and a frame body, wherein
the light emitting element is disposed on the back plate and is configured to provide an illumination beam, and
the frame body is disposed on the back plate to surround the light emitting element, the frame body comprises a light transmitting portion and a reflecting portion, the light transmitting portion is located at an edge of a light emitting side of the direct type backlight module, the reflecting portion is located between the light transmitting portion and the back plate, and the light transmitting portion has a carrier portion, wherein the illumination beam is configured to be transmitted into the light transmitting portion, transmitted to the carrier portion of the light transmitting portion by reflection of the reflecting portion, and then emitted.

2. The direct type backlight module according to claim 1, wherein the reflecting portion has a first optical surface inclined to an overall extending direction of the direct type backlight module, and the light transmitting portion is connected to the reflecting portion and covers the first optical surface.

3. The direct type backlight module according to claim 1, wherein the light transmitting portion has a second optical surface parallel to an overall extending direction of the direct type backlight module, and the second optical surface has a prism structure.

4. The direct type backlight module according to claim 1, further comprising at least one optical element, wherein the carrier portion carries the at least one optical element.

5. The direct type backlight module according to claim 4, wherein the at least one optical element comprises a diffusion element and at least one optical film.

6. The direct type backlight module according to claim 1, wherein the reflecting portion and the light transmitting portion are made of different materials and are simultaneously manufactured.

7. The direct type backlight module according to claim 1, wherein the frame body further comprises an adhesive layer connected between the light transmitting portion and the reflecting portion to fix the light transmitting portion and the reflecting portion.

8. The direct type backlight module according to claim 1, wherein both the light transmitting portion and the reflecting portion have at least one engaging structure, and the light transmitting portion and the reflecting portion are combined by the at least one engaging structure thereof.

9. The direct type backlight module according to claim 1, wherein the frame body further comprises a light transmitting buffer member connected to a top end of the light transmitting portion, and the light transmitting portion is located between the light transmitting buffer member and the reflecting portion.

10. The direct type backlight module according to claim 1, wherein the reflecting portion is made of a white material having a reflecting property.

11. The direct type backlight module according to claim 1, wherein the frame body further comprises a light transmitting support member disposed on the light transmitting portion to support a part of the light transmitting portion.

12. The direct type backlight module according to claim 11, wherein the light transmitting support member and the light transmitting portion are made of the same material and are integrally manufactured.

13. A display device comprising a direct type backlight module and a display panel, wherein
the direct type backlight module is configured to provide an illumination beam and comprises a back plate, a light emitting element, and a frame body, wherein
the light emitting element is disposed on the back plate and is configured to provide the illumination beam, and
the frame body is disposed on the back plate to surround the light emitting element, the frame body comprises a light transmitting portion and a reflecting portion, the light transmitting portion is located at an edge of a light emitting side of the direct type backlight module, the reflecting portion is located between the light transmitting portion and the back plate, and the light transmitting portion has a carrier portion, and
the display panel is disposed on a transmission path of the illumination beam and on the frame body, wherein the illumination beam is configured to be transmitted into the light transmitting portion, transmitted to the carrier portion of the light transmitting portion by reflection of the reflecting portion, and then emitted to an edge of the display panel.

14. The display device according to claim 13, wherein the reflecting portion has a first optical surface inclined to an overall extending direction of the direct type backlight module, and the light transmitting portion is connected to the reflecting portion and covers the first optical surface.

15. The display device according to claim 13, wherein the light transmitting portion has a second optical surface parallel to an overall extending direction of the direct type backlight module, and the second optical surface has a prism structure.

16. The display device according to claim 13, further comprising at least one optical element, wherein the carrier portion carries the at least one optical element.

17. The display device according to claim 15, further comprising:
a connecting element disposed on the second optical surface and connected between at least one optical element and the light transmitting portion.

18. The display device according to claim 13, wherein the light transmitting portion is trimmed flush with the display panel.

19. The display device according to claim 13, wherein the display panel is a liquid crystal display panel.

20. The display device according to claim 16, wherein the at least one optical element comprises a diffusion element and at least one optical film.

* * * * *